United States Patent [19]

Tsou et al.

[11] Patent Number: 4,753,861
[45] Date of Patent: Jun. 28, 1988

[54] ORGANIC OPTICAL INFORMATION STORAGE MEDIUM EMPLOYING CRYSTALLINE TRANSITIONS

[75] Inventors: Dean T. Tsou, Solon; Marc W. Blachman, Highland Heights; James D. Burrington, Richmond Heights, all of Ohio

[73] Assignee: The Standard Oil Company, Cleveland, Ohio

[21] Appl. No.: 943,412

[22] Filed: Dec. 19, 1986

Related U.S. Application Data

[63] Continuation-in-part of Ser. No. 735,231, May 17, 1985, abandoned.

[51] Int. Cl.$^4$ .......................... G11B 7/24; G01D 9/00; G03C 1/72; G03C 5/16
[52] U.S. Cl. ...................................... 430/19; 430/270; 430/288; 430/495; 430/945; 524/87; 524/485; 524/486; 346/135.1
[58] Field of Search ............... 430/945, 270, 495, 288, 430/19; 524/485, 486, 87

[56] References Cited

PUBLICATIONS

Wilson et al, "Thermally Induced Resolution of Racemic 1,1'-Binaphthyl", 97 J. Am. Chem. Soc. (1975), pp. 1474–1478.
Placock et al., "Solid State Resolution of Racemic 1,1'-Binaphthyl", 93 J. Am. Chem. Soc. (1971), pp. 1291–1292.
Chernov et al, "Phonon Contribution to Melting of Thin Films", NMR Study of Diphenyl 38 JETP Letters (1983), pp. 345–349.
Kress et al, "Solid State Resolution of Binaphthyl etc.", 102 J. Am. Chem. Soc. (1080), pp. 7709–7714.
Bader et al, "Two Crystalline Modifications of 1,1'-Binaphtyl", J. Chem. Soc., 1965, pp. 1543–1544.

*Primary Examiner*—Paul R. Michl
*Assistant Examiner*—Mark R. Buscher
*Attorney, Agent, or Firm*—M. F. Esposito; J. G. Curatolo; L. W. Evans

[57] ABSTRACT

Erasable optical memories for storing information are prepared from organic materials having two stable crystalline forms. Each crystalline form has at least one different optical characteristic and the materials are reversibly thermally convertible between the crystalline forms. Information is recorded or erased with a laser beam that heats a film of the organic material in a local area to change the crystalline form. Information may also be recorded or erased by melting a local area or all of the film and quickly cooling it to restore the original crystalline form. Examples of such organic compounds are biaryl compounds, such as binaphthyls, bianthryls and biquinolyls.

11 Claims, 3 Drawing Sheets

ORGANIC OPTICAL INFORMATION STORAGE MEDIUM EMPLOYING CRYSTALLINE TRANSITIONS

This application is a continuation-in-part application of parent application Ser. No. 735,231, filed May 17, 1985, abandoned.

BACKGROUND OF THE INVENTION

Numerous solid materials for optically storing information have been proposed. Typically, the solid optical information medium has at least two different optical states. Information is stored in the medium by switching small regions in a thin film of the medium from one optical state to another. Generally, the switching of optical states is stimulated by a focused beam of energy in the form of coherent (laser) or incoherent light, X-rays, an electron beam, etc. The energy beam usually produces localized heating in the medium so that a relatively small region switches its optical state by thermal stimulation. In most of the known optical data storage media, the information storage or writing process is irreversible, so that after information is once written into the memory, it cannot be erased. These known media can be used only to prepare write-once, read-only memories. Information stored in an optical memory is retrieved or read by scanning the storage medium with another beam of energy, but one of insufficient energy to write additional information into the memory. For example, a detector may be disposed on the opposite side of the medium to detect whether the reading beam is transmitted through the medium in the locations where information storage, i.e. optical switching, might have occurred. Or, the reflected beam may be sensed to determine the information content at each potential data storage point in the medium. Information is present or absent depending upon the degree of transmission, reflection, polarization, etc. of the reading beam.

Most optical storage media are based on inorganic compounds or mixtures such as chalcogenides. These inorganic materials have relatively high thermal conductivities. Because these media relatively quickly conduct heat away from a writing beam, a relatively large area must be reserved for storage of each item of information and the writing beam must supply a relatively large amount of energy to record each item. Therefore, it is desirable to use low thermal conductivity materials, such as organic compounds, for optical information storage media.

An example of an organic memory medium is disclosed in U.S. Pat. No. 3,668,663. There, certain organic materials are disclosed that may be switched between dimer and monomer states by application of energy beams of appropriate frequencies. Double carbon bonds are broken or established to change the refractive index of localized portions of the organic medium. In U.S. Pat. No. 4,443,532, another organic optical storage medium is disclosed. The optical characteristics of the media described there are changed by an electron beam that is theorized to cause non-reversible crystalline changes. It is not clear whether the reported crystalline changes are really chemical reactions induced by ions created by the electron beam or are true crystalline changes.

It is desirable that an organic optical information storage medium be erasable, i.e. permit repeated writing, reading, erasing and rewriting, for versatility, and store information without a chemical reaction taking place, for reliability. The invention solves the problems of known optical information storage media by providing high storage density, organic media in which, repeatedly, information may be stored, retrieved and erased by thermally induced, reversible changes in crystalline structure.

SUMMARY OF THE INVENTION

It is the primary object of the present invention to provide an organic optical information storage medium which exhibits reversible changes in crystalline structure when exposed to thermal energy.

It is a further object of the present invention to provide a biaryl organic optical information recording material which exhibits reversible changes in crystalline structure when exposed to thermal energy.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects in accordance with the purpose of the present invention as embodied and broadly described herein, the organic optical storage medium of the present invention comprises an organic compound having two stable crystalline states, one of which is optically active and the other being optically inactive selected from the group consisting of biaryls and biquinolyls, a polymer diluent capable of preventing movement of the organic compound and a UV-curable cross-linking agent compatible with the organic compound.

DETAILED DESCRIPTION OF PREFERRED EMBODIMENTS

Figure 1:
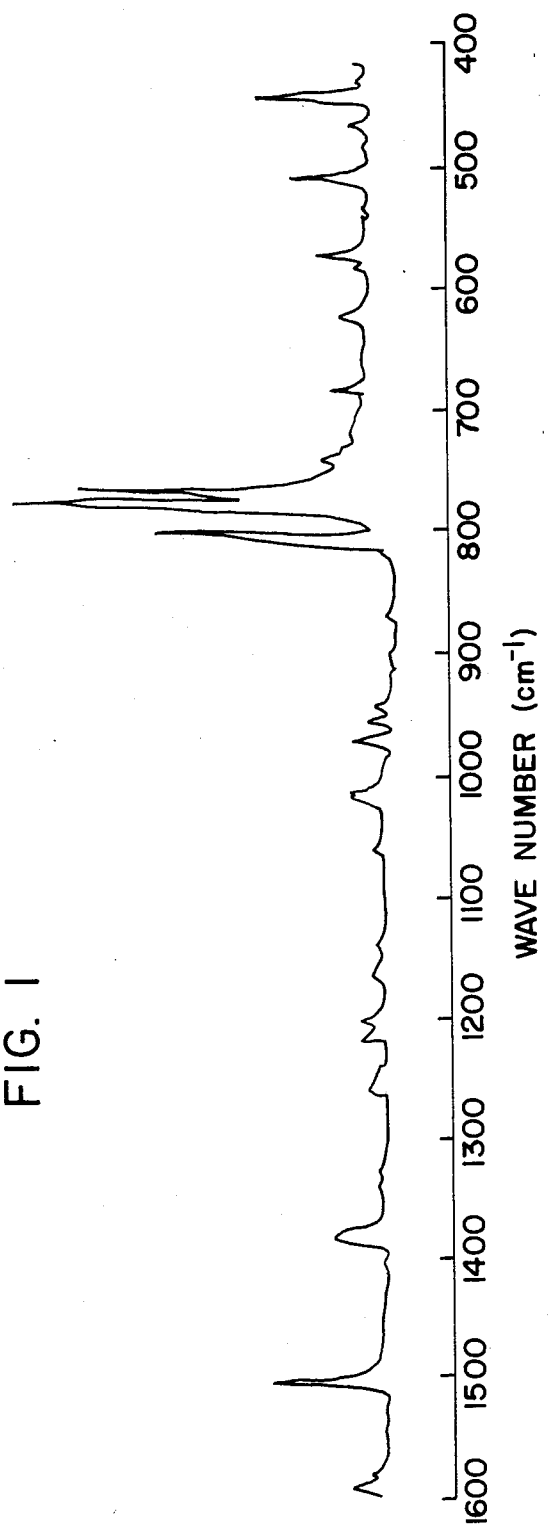
FIG. 1 is a measured absorbance spectrum of a thin film of an information storage medium according to the invention in its optically active crystalline form.

In the invention, information is stored in a thin film of a medium having two stable phases, each of the phases having at least one distinct optical characteristic. It is known to direct a "writing" energy beam at a thin film of material to heat the film locally and induce a transition in an optical characteristic. By that transition, information is written in, i.e. recorded in, or erased from the film medium. The information stored is retrieved by directing a "reading" beam on the film and measuring some characteristic of the transmitted or reflected beam. The size of the writing and reading beams and characteristics of the medium determine the maximum density of information storage possible. Because techniques for forming the energy beams and scanning and controlling the beams to write on and read from the storage media are known in the art, there is no need to discuss those techniques nor the apparatus used to perform the writing and reading processes.

Organic storage media are inherently poor thermal conductors. Therefore, localized heating in an organic film may be confined to a smaller area than with an inorganic medium. As a result, higher information storage density and/or improved clarity (i.e. signal-to-noise ratio) in information storage can be achieved with organic films. To achieve that desired high signal-to-noise ratio, the medium should also be immune to environmental temperatures. That is, the threshold for transitions should be well above any temperature, such as 100° C., to which the medium might be exposed. The inventive medium meets all these needs.

In accordance with the present invention, the information storage medium comprises an organic monomer material, a polymer diluent and a UV-curable cross-linking agent compatible with the organic monomer. The organic monomer materials have two stable crystalline states, one of which is optically active (i.e. chiral) and the other of which is optically inactive (i.e. racemic). These function as the active recording material. We have found that these materials make excellent media for optical storage of information. The preferred materials have a single interannular bond connecting two chains of two or more benzene rings. The benzene rings in each chain share common carbon-carbon bonds, so that the general formula for such compounds is:

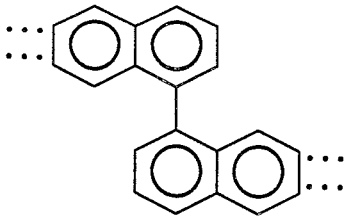

When heat is applied to materials of this structure, rotation about the interannular bond is permitted so that a reversible transition between different crystalline forms can take place. The different optical characteristics of the two crystalline structures are manifested as different light absorbance and reflectance, changes in infrared, Raman and X-ray diffraction spectra and different indexes of refraction.

Among the preferred forms of the compounds having the structure and functioning in the novel optical storage medium are the biaryls including 1,1'-binaphthyl having a general formula

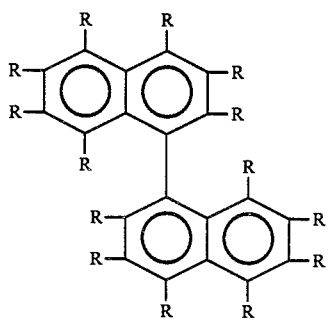

1,1'-bianthyryls having a general formula

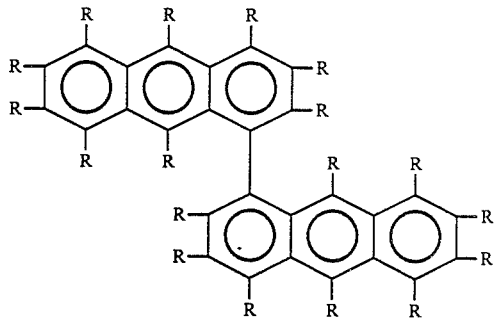

and 4,4'-biquinolyls having a general formula

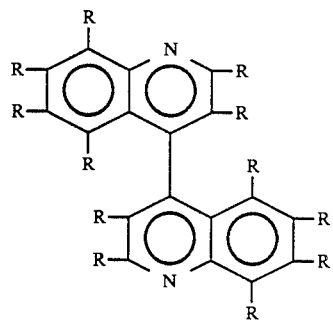

In these formulas, R may be selected from one or more of oxygen, nitrogen, or sulfur containing substituents, hydrogen, hydrocarbyl or halo. That is, for a particular medium according to the invention, the R's may all be the same, the R's on one side of the interannular bond may all be the same or the R's may be any combination of the elements and radicals listed in the preceding sentence. Derivatives of these compounds can also be used as a storage media according to the invention.

A particularly preferred compound for use in forming the storage medium according to the invention is 1,1'-binaphthyl where each R in the general formula shown above for 1,1'-binaphthyl is hydrogen. The characteristics of the two crystal forms are listed in Table 1.

TABLE 1

| Crystalline Forms of 1,1'-Binaphthyl | | |
|---|---|---|
| | Racemic (Optically Inactive) | Chiral (Optically Active) |
| Melting Point (°C.) | 145 | 159 |
| Density (grams/cc) | 1.297 | 1.180 |
| Crystalline Structure | monoclinic | tetragonal |

As the characteristics of Table 1 show, heating the racemic form of 1,1'-binaphthyl will convert it to the chiral form. It is not necessary to melt the crystal, although melting it at a temperature below the melting point of the chiral form will also convert the crystalline form. Heating at a temperature from about 76° C. to 150° C. is sufficient to bring about the conversion. The lower the temperature used, the longer the period of heating required. The chiral form may be converted back to racemic by melting the chiral form and quickly resolidifying it.

We prefer that the heating, whether for writing on or erasing from the storage media, be done with a laser because it can be focused to a small area and coherent light is less likely than an electron beam or an X-ray beam to induce an undesired chemical reaction. By choosing the shape of the laser pulse, the rate of heating and cooling can be controlled to bring about the desired crystalline transitions. Of course, an entire memory unit might be erased by direct heating of a film to a temperature above the chiral form melting point, rather than by using a laser.

Due to the high crystallinity of 1,1'-binaphthyl a polymer matrix is included in the storage information medium of the present invention to ensure the formation of very small crystallites of the organic monomer and a very uniform thin film. The polymer matrix should be rigid to prevent movement of the 1,1'-binaphthyl. A highly cross-linked polymer matrix is preferred. Accordingly, a UV-curable cross-linking agent is a desirable part of the recording layer. Initially, a polymer diluent is used in the storage information medium to separate the 1,1'-binaphthyl crystallites to increase the solution viscosity in order that spin coating techniques can be used to apply the active recording layer to the substrate.

The selected UV-curable cross-linking agent and polymer diluent should have proper optical properties so that they will not interfere with the optical reading and writing of information. In addition, the polymer diluent should have proper molecular weight for viscosity control. Of course, both the UV agent and the polymer diluent should also be compatible with the active ingredient, 1,1'-binaphthyl, so as to not interfere with the interconversion of the two crystalline forms during information recording.

Preferably, the polymer diluent can be selected from polycarbonate (PC), poly(methyl methacrylate) (PMMA), polysulfone or other suitable polymers with the required properties. The polycarbonates are especially preferred.

The UV-curable cross-linking agent can be selected from aliphatic or aromatic diacrylates. These are generally available from ARCO under the Trademark SARTOMER. SARTOMER SR-349 is especially preferred. In addition, conventional photoinitiator is usually used in small amount for the UV-curing process.

Preferably, the composition of the information storage medium (i.e. active recording layer) is as follows:
1,1'-Binaphthyl: 10%–90%
PC: 0.01%–50%
UV-curable: 0.01%–80%

The relative amount of 1,1'-binaphthyl, polymer diluent and UV-curable cross-linking agent is important in determining the thermal properties of the final thin film. With more UV-curable cross-linking agent used the final film tends to be more rigid and thermally more stable. More laser power is thus needed for the writing process. However, if not enough UV-curable cross-linking agent is used, 1,1'-binaphthyl movement within the not so rigid matrix may cause problem of instability of the recording film. Both the molecular weight and the amount of the polymer diluent are important in determining the resulting 1,1'-binaphthyl crystallite size and the film thickness. These may be optimized by conventional means.

Most preferably, the information storage medium composition comprising
1,1'-Binaphthyl: 50%
Polymer diluent: 5%–25%, in particular polycarbonate
UV curable: 25%–45%, in particular SR-349

Figure 3:
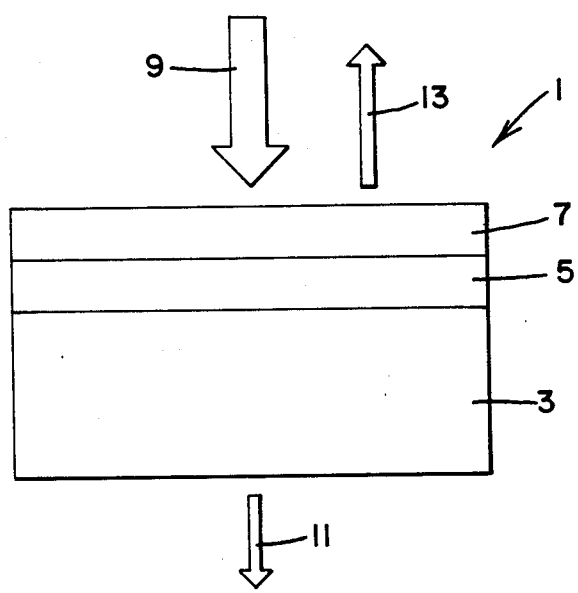
FIG. 3 is a schematic cross sectional view of an optical memory device incorporating the inventive medium.

A schematic cross sectional view of a novel optical memory element 1 incorporating the information storage medium of the present invention is shown in FIG. 3. A transparent substrate 3 of glass or plastic has a film 5 disposed on it. Film 5 comprises the information storage medium composition described above including the active recording material, binaphthyl, bianthryl or biquinolyl. A transparent coating 7 is disposed on film 5 for protection of the film. Coating 7 may be a polymer and should be transparent to the reading, writing and erasing beams. In a preferred embodiment a subbing layer may be applied to the substrate prior to deposition of film 5.

A reading beam 9 is shown striking coating 7. A portion 11 of beam 9 is transmitted through the film and a portion 13 of beam 9 is reflected from the film. It is preferred that the presence or absence of information in the memory be determined by measuring the strength of reflected portion 13, although the strength of transmitted portion 11 could be detected or other optical effects exploited to read from the memory unit. A writing beam would not be different from reading beam 9, except it would have a higher energy density and the reflected and transmitted portions would be of no concern.

The material used for the optical subbing layer to improve substrate smoothness and/or adhesiveness can be selected from the various titanium chelate compounds such as diisopropyloxy-bis(acetylacetonato)-titanium or other suitable compounds such as acrylate resin(s) and can be determined by those skilled in the art.

The substrate can be glass, aluminum or thermoplastic disks. The preferred substrate is plastic disk made of polycarbonate or polymethylmethacrylate or other polymers with low birefringence and high thermal stability. The suitable substrate can be determined by those skilled in the art. The material used for protective overcoat usually consists of some acrylate monomer or prepolymer, photoinitiator and adhesion promoter. When UV-cured it forms a transparent, non-yellowing hard topcoat. The material selection for the protective overcoat can be determined by those skilled in the art.

A suitable dye is needed for the conversion of laser light energy to thermal energy. Many dyes have been studied for optical storage application. The dye chosen should have a strong absorption band at the right laser wavelength and be stable during the energy conversion process. Dyes such a phthalocyanines, naphthoquinones, carbocyanines or squarylium dyes have been identified as suitable for optical information storage applications. Stability of the dye is usually a problem. The suitable dye can be mixed within any of the layers. The dye molecules can be covalently bonded to any of the polymers used in the various layers and thus becomes an integral part of the layer. The selection of dye material as well as the location of the dye in the multi-layered disk can be determined by those skilled in the art.

We performed a number of tests with the medium described in Table 1 to prove the usefulness of the invention.

EXAMPLE 1

Figure 2:
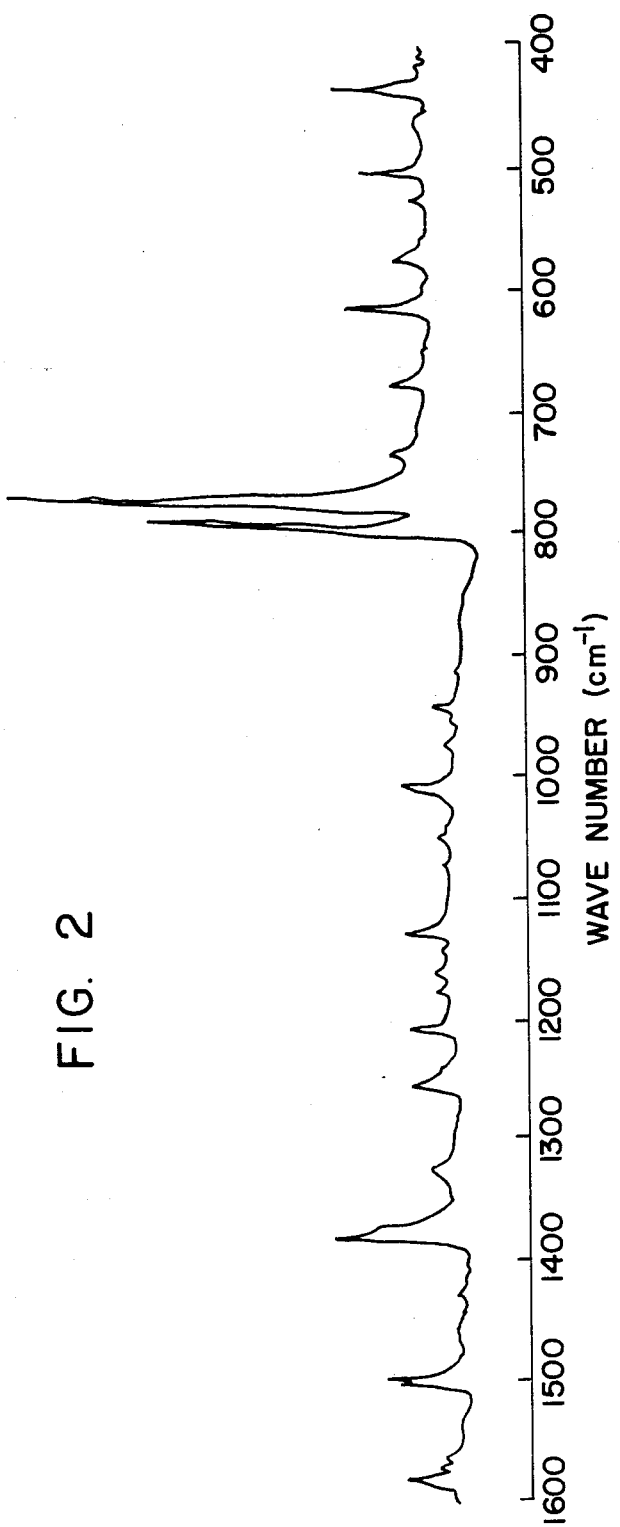
FIG. 2 is a measured absorbance spectrum of a thin film of an information storage medium according to the invention in its optically inactive crystalline form.

An infrared spectrum of a sample of the optically inactive form of the 1,1'-binaphthyl of Table 1 appears in FIG. 1. The sample was placed in a test tube and maintained at 150° C. for 15 hours. The sample was then two times subjected to the steps of dissolution in acetone, crystallization in the acetone solution at −78° C. temperature and dried in a vacuum. The resulting 1,1'-binaphthyl showed a specific optical rotation of +190° indicating conversion to a chiral form. The infrared spectrum of the sample, FIG. 2, shows marked differences from the original sample at wave numbers 575, 770, 970, 1130 and 1180 cm$^{-1}$.

EXAMPLE 2

A sample of the optically active 1,1'-binaphthyl of Table 1 was heated for one minute at 180° C. and quickly cooled to solidify. The specific optical rotation of the solidified sample was measured as 0.14° proving almost total conversion to the optically inactive form of the 1,1'-binaphthyl of Table 1.

EXAMPLE 3

A sample of optically inactive 1,1'-binaphthyl of Table 1 dissolved in methylene chloride (100 grams/cm$^3$) was sprayed on glass slides with an atomizer and covered with a second glass slide. The slides were maintained at a temperature of 150° C. for varying amounts of time and their infrared spectra analyzed to show the degree of conversion of the film to the optically active form. The results shown in Table 2 indicate the rate of crystalline interconversion over time.

TABLE 2

| Heat Treat Time (Min.) | Percentage of Optically Inactive Material |
| --- | --- |
| 0 | 100 |
| 10 | 37 |
| 30 | 27 |
| 60 | 23 |

EXAMPLE 4

A sample of the optically inactive form of the 1,1'-binaphthyl of Table 1 containing a small amount of the optically active form was sprayed on a number of glass slides to a density of 310×10$^{-6}$ grams/cm$^2$ and covered with another slide to avoid sublimation. The slides were maintained at a temperature of 150° C. for varying amounts of time and their infrared spectra analyzed to show the degree of conversion of the film to the optically active form. The results in Table 3 indicate more rapid interconversion of crystalline forms than in Example 3.

TABLE 3

| Heat Treat Time (Min.) | Percentage of Optically Inactive Material |
| --- | --- |
| 0 | 97 |
| 1 | 95 |
| 2 | 95 |
| 3 | 91 |
| 5 | 92 |
| 20 | 8 |
| 40 | 6 |

EXAMPLE 5

1,1'-binaphthyl-containing thin film. A sample was prepared dissolving 0.25 g of chiral 1,1'-binaphthyl, 0.15 g of SARTOMER SR-349, 0.10 g of polycarbonate, and 7.5 mg of benzophenone in 3.5 ml of a 4/1 mixture of 1,1,2-trichloroethane and chloroform. The solution was filtered through a 0.4 μm filter. A quartz disc (1 inch diameter, 1/16 inch thick) was cleaned in chloroform and wetted with the sample solution. The disc was then spun in a spin caster at 2000 rpm for about 6 minutes. While spinning, the coated disc was subjected to irradiation with a 150 W Xenon lamp. A uniform thin hard film was formed on the quartz disc (Composition 1,1'-binaphthyl/PC/SR-349=50/20/30).

The thin film obtained as described above was subjected to heat treatment in an oven kept at 100° C. for three minutes. The film was cooled to room temperature. The film thickness and refractive index were analyzed by UV-Vis spectroscopy (interferometric method). The heat treatment was repeated at 120° C., 140° C., 160° C., 180° C. and 200° C. Following each heat treatment, the film thickness and refractive index were all monitored by UV-Vis spectroscopy.

| Temperature (°C.) | Film Thickness (nm) |
| --- | --- |
| 25 | 716 |
| 100 | 715 |
| 120 | 714 |
| 140 | 709 |
| 160 | 714 |
| 180 | 709 |
| 200 | 717 |

The film showed no change in thickness. However the refractive index changed when the film was heated above 180° C. This demonstrated the films feasibility as a recording medium.

EXAMPLES 6–8

Thin films were made using procedures described in example 5 with the following composition Experiment 6: 1,1'-Binaphthyl/PC/SR-349=50/10/40

Experiment 7: 1,1'-Binaphthyl/PC/SR-349=50/40/10

Experiment 8: 1,1'-Binaphthyl/PC/SR-349=0/20/80

These films were heated in the same fashion as described in example 5. Following each heat treatment the film thickness and refractive index were all monitored by UV-Vis spectroscopy:

| Temperature °C. | Film Thickness (nm) | | |
| --- | --- | --- | --- |
| | Experiment 6 | Experiment 7 | Experiment 8 |
| 25 | 663 | 1078 | 517 |
| 100 | 660 | 1079 | 514 |
| 120 | 660 | 1073 | 512 |
| 140 | 659 | 1086 | 510 |
| 160 | 660 | 1055 | 506 |
| 180 | 658 | 1037 | 508 |
| 200 | 657 | 1019 | 500 |

Experiment 6 showed no film thickness change and no refractive index change during the entire heating experiment, indicating that with higher UV-curable cross-linking agent content the film was more rigid and thermally more stable.

Experiment 7 showed both film thickness and refractive index change, indicating that with less UV-curable cross-linking agent the film was less rigid and less thermally stable. The film thickness change is probably due to 1,1'-binaphthyl subliming out of the thin film.

Experiment 8 (a control experiment with no 1,1'-binaphthyl present) showed no film thickness and refractive change. Note the film thickness differences between the examples which were due to the different polymer diluent contents in the systems.

As illustrated in the examples, it is desirable that the optical memory material be disposed on a substrate, such as glass or a plastic, that is transparent to the reading and writing beams. The film may be deposited by known means such as spraying, spin casting or roll casting. The film should be protected from damage by a second piece of glass or a transparent polymeric coating.

The invention has been described with reference to certain preferred embodiments. Various modifications, additions and substitutions will occur to those of skill in the art. Therefore, the scope of the invention is limited solely by the following claims.

We claim:

1. An organic optical information storage medium reversibly, thermally convertible between two different crystalline forms, each crystalline form having a distinct optical characteristic, comprising a mixture of an organic compound selected from the group consisting of a biaryl having a single interannular bond connecting two chains of two or more benzene rings or a biquinolyl, a polymer diluent and a UV-curable cross-linking agent compatible with said organic compound.

2. The storage medium of claim 1 wherein said organic compound is a 1,1'-binaphthyl compound having the formula

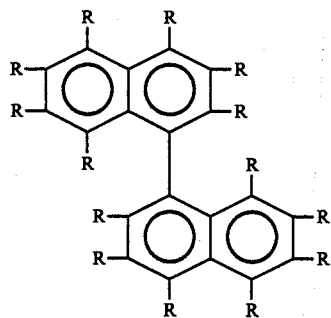

where each R is chosen from the group consisting essentially of: hydrogen; hydrocarbyl; halo; and oxygen, nitrogen or sulfur containing substituents.

3. The storage medium of claim 1 wherein said organic compound is 1,1'-bianthryl compound having the formula

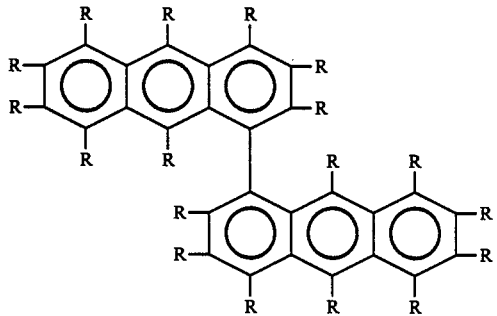

where each R is chosen from the group consisting essentially of: hydrogen; hydrocarbyl; halo; and oxygen, nitrogen or sulfur containing substituents.

4. The storage medium of claim 1 wherein said organic compound is a 4,4'-biquinolyl compound having the formula

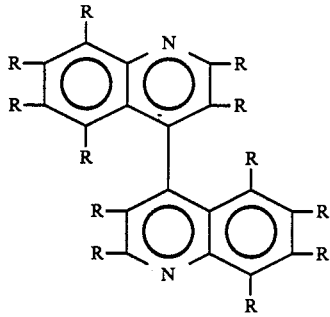

where each R is chosen from the group consisting essentially of: hydrogen; hydrocarbyl; halo; and oxygen, nitrogen or sulfur containing substituents.

5. An optical information storage element comprising a substrate and a film disposed on said substrate, said film comprising an organic compound reversibly, thermally convertible between two different crystalline forms, each crystalline form having a distinct optical characteristic selected from the group consisting of biaryls and having a single interannular bond connecting two chains of two or more benzene rings and biquinolyls, a polymer diluent and a UV-curable cross-linking agent compatible with said organic compound.

6. The storage element of claim 5 including a transparent protective coating disposed on said film.

7. The storage element of claim 5 wherein said organic compound is a 1,1'-binaphthyl compound having the formula

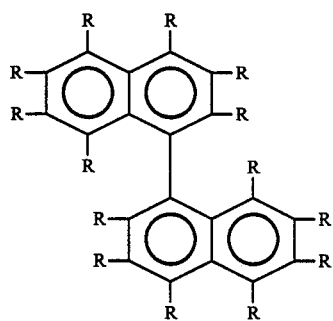

where each R is chosen from the group consisting essentially of: hydrogen; hydrocarbyl; halo; and oxygen, nitrogen or sulfur containing substituents.

8. The storage element of claim 5 wherein said organic compound is a 1,1'-binanthryl compound having the formula

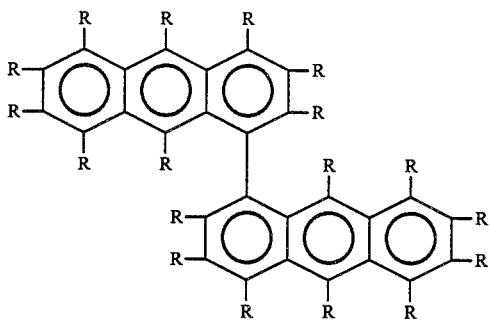

where each R is chosen from the group consisting essentially of: hydrogen; hydrocarbyl; halo; and oxygen, nitrogen or sulfur containing substituents.

9. The storage element of claim 5 wherein said organic compound is a 4,4'-biquinolyl compound having the formula

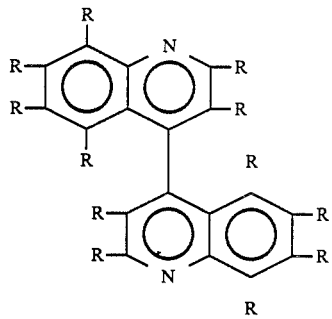

where n has a value from one to six and R is chosen from the group consisting essentially of: hydrogen; hydrocaryl; halo; and oxygen, nitrogen or sulfur containing substituents.

10. A process for recording information in or erasing information from the information storage element of claim 6 including directing a beam of light at said element, locally heating a portion of said element and inducing a transition in said organic compound from a first crystalline form to a second crystalline form having a higher melting point than said first crystalline form.

11. A process for recording information in, or erasing information from the storage element of claim 6 including locally heating a portion of said element to a temperature above the higher of the melting points of the two crystalline forms of said organic compound and rapidly cooling said melted element to recrystallize said element in the crystalline form having the lower melting point.

* * * * *